United States Patent Office 3,746,598
Patented July 17, 1973

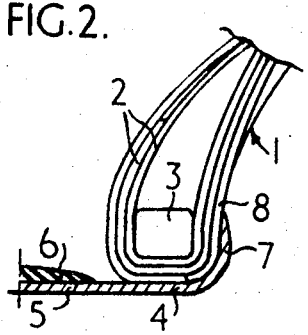
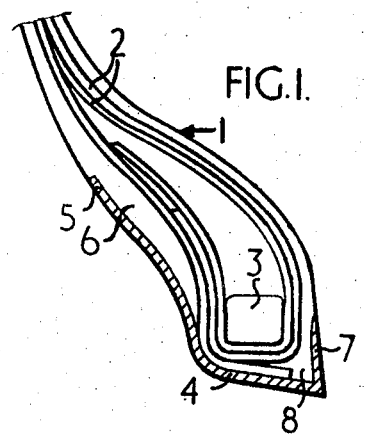
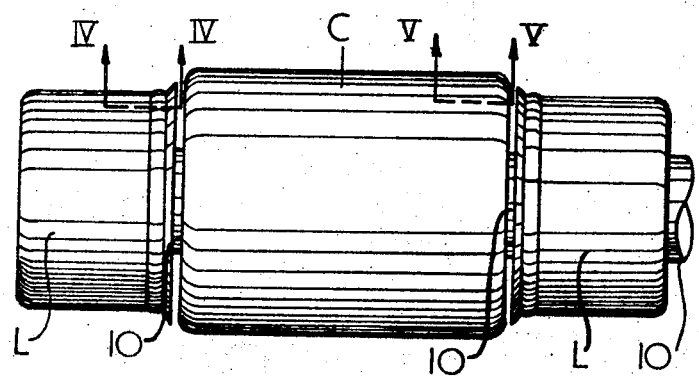
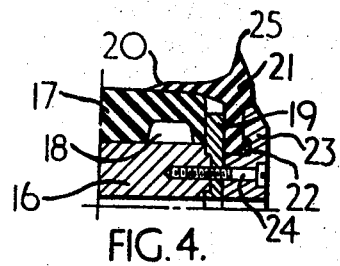
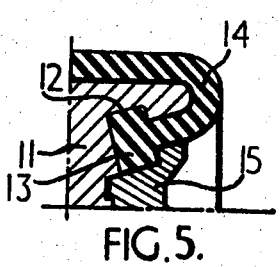

3,746,598
MANUFACTURE OF PNEUMATIC TYRES
Noel Nebout, Montlucon, France, assignor to
Dunlop Limited, London, England
Filed Mar. 22, 1971, Ser. No. 126,546
Claims priority, application France, Mar. 24, 1970,
7010538
Int. Cl. B29h 17/22
U.S. Cl. 156—400         7 Claims

ABSTRACT OF THE DISCLOSURE

A method and apparatus for manufacture of a pneumatic tyre. A carcass is positioned on a drum with the beads laterally adjacent the drum and a reinforcing strip for the tyre is arranged on an annular surface which is expansible and has a profile complementary to the part of the bead nearest the drum and drum axis. The annular surface is brought up to the drum to be opposite the bead, the surface having a diameter less than the bead, and then expanded to bring the strip into contact with the bead.

---

The present invention relates to building pneumatic tyre covers.

It is known that very often in such covers, chafer strips of rubberised fabric or part vulcanised profiled rubber are provided. These are placed during the building under each bead in such a way that after moulding and vulcanisation, the internal edge of the bead takes the shape of a lip having an angular profile which bears on the rim of the wheel. These chafer strips play an important role because they form a sort of retaining bag for the bead rubber which softens during vulcanisation. Unfortunately they are very difficult to put in position because their edge which is towards the inside of the tyre, has to be folded along the internal surface thereof, which means that this edge has to be introduced during the tyre building between the bead of the carcass and the shoulders of the building drum on which the carcass is positioned.

According to the invention there is provided a method for the manufacture of a pneumatic tyre which comprises positioning or assembling on a drum a carcass in which reinforcing plies are turned up around the beads, the beads being laterally adjacent to the drum, arranging a separate reinforcing strip for the tyre bead on an annular surface which is expansible and the profile of which is substantially complementary to that part of the bead which is nearest to the drum and the drum axis, bringing up the annular surface towards the drum to be opposite the bead, the diameter of the annular surface being less than the minimum diameter of the bead, and expanding the surface to bring the reinforcing strip into contact with the previously formed bead.

After bringing the strip into contact with the bead, following which the internal portion of the strip, e.g. the chafer strip sticks to the bead, the annular surface can be contracted again, the shaping of the carcass can be proceeded with while the strip remains adhered to the bead by its internal portion, then the annular surface can be reapplied on to the strip in order to keep this in place during its folding back along the external surface of the carcass.

According to the invention also an apparatus for positioning a separate reinforcing strip under a previously formed pneumatic tyre bead on a carcass which is positioned on a drum such that the bead is laterally adjacent to the drum comprises an annular expansible surface the profile of which is substantially complementary to that part of the bead which is to be nearest to the drum and the drum axis, and means to bring the annular surface to the drum to a position opposite the bead, the diameter of the expansible surface being variable at least between a value less than the minimum bead diameter and a value at which the surface applies a strip positioned on it to the bead.

The invention will now be described in more detail, by way of example only, with reference to the accompanying drawings in which:

FIG. 1 is a diagrammatic view, in radial section, of a pneumatic tyre bead provided with a chafer strip under the bead and vulcanised;

FIG. 2 is a view similar to FIG. 1 but showing the bead of the tyre during positioning of the chafer strip and before its vulcanisation;

Figure 10:
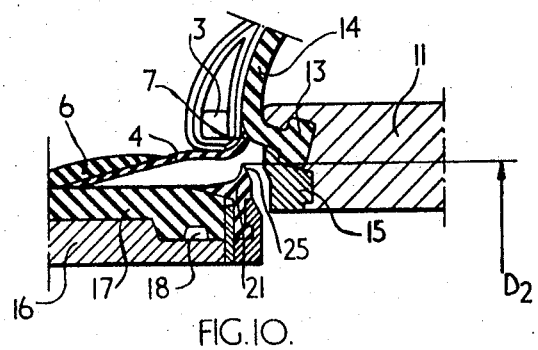
Figure 11:
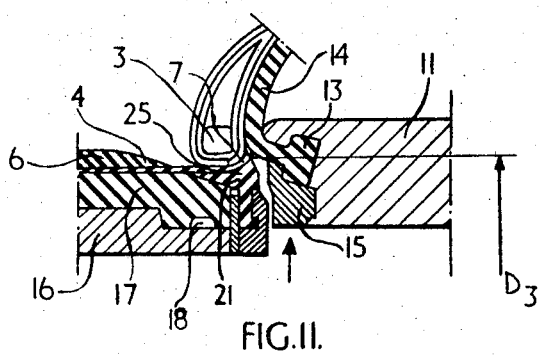
Figure 12:
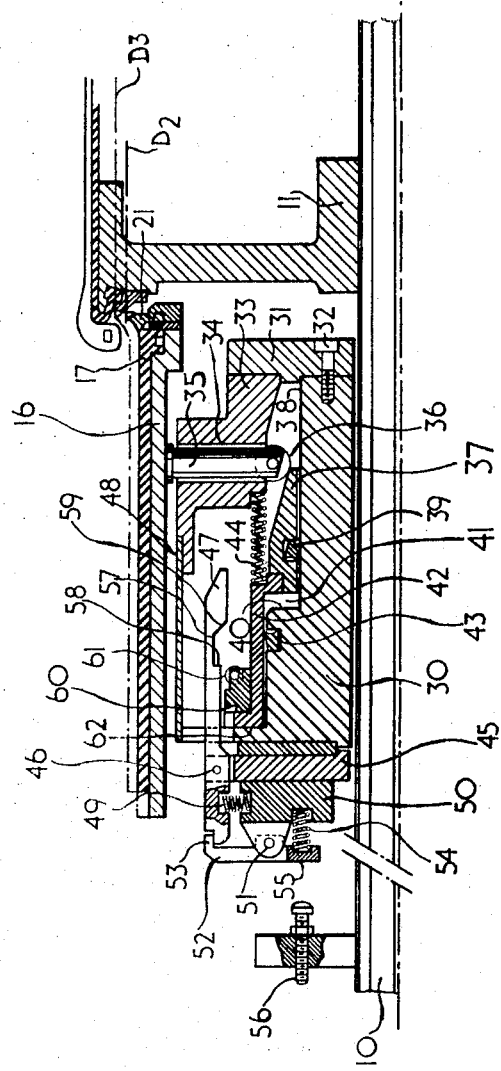
Figure 13:
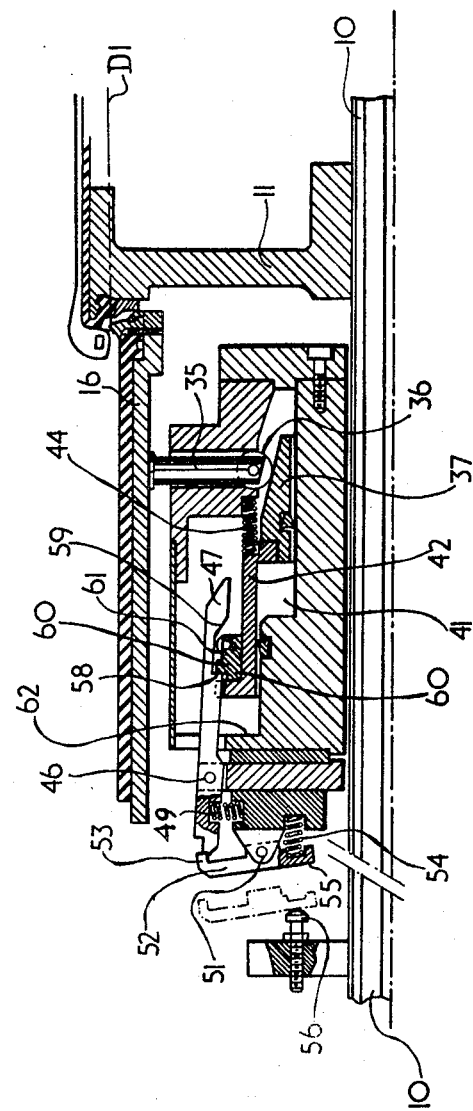

FIG. 3 is a lateral elevated diagrammatical view of a pneumatic tyre building drum, improved according to the invention, FIGS. 4 and 5 are sections of details on a larger scale, along the line IV—IV and V—V respectively of FIG. 3, FIGS. 6–11 are partial views in radial section of the drum, illustrating the various stages of carrying out the method according to the invention, FIGS. 12 and 13 are partial radial section views of the drum showing the mechanism used for carrying out the method of the invention, the two important positions of its operation.

As shown in FIG. 1, a pneumatic tyre 1 comprises in the standard manner, a carcass in which the plies 2 pass round bead wires 3. Under the pneumatic tyre bead 3 there is placed a chafer strip 4, a lateral portion 5 of which is folded back on the side rubber 6 against the carcass plies, whereas the other lateral portion 7 rises slightly along the internal surface of the tyre. On moulding, the rubber 8 of the bead forms together with the chafer strip 4, a point which is directed at an angle towards the interior and towards the axis of the tyre.

FIG. 2 shows the bead of the tyre 1 during building and before moulding and vulcanisation, the plies 2 and the rubber 8 having been put in position round bead wire 3.

The chafer strip 4 is partially positioned, i.e. its lateral portion 7 has been folded along the base of the lateral surface of the tyre, while the external lateral portion 5 and the rubber 6, are being put in position.

It is this positioning of the strip 4 together with the folding of the lateral internal portion 7, which the invention intends to carry out rapidly, simply and with accuracy.

For this purpose, a building drum is used of the type shown in FIGS. 3–13, and which, as shown in FIG. 3, comprises a central part C and two lateral parts L. These three parts can be moved by rotation and by translation on a shaft 10 and they can be expanded and contracted.

The central part of the drum has lateral supports 11 (FIG. 5) the external edges of which are provided with a peripheric groove 12, having a cross-section which is part of a T-shape, in which is engaged the corresponding bead 13 of a diaphragm 14 forming the lateral surface of the drum. A ring having a profile which completes the T-shape of the groove cross-section 15 is bolted to the support 11 to secure the bead 13 of the diaphragm 14 into the groove 12. The supports 11 can be brought nearer to or separated from each other and the diaphragm 14 can be expanded or deflated according to the requirements of the building process.

Each lateral part of the building drum comprises, as shown in FIG. 4, an expansible support, formed of longitudinal bars or staves 16 which are laterally movable and on which a rubber sleeve 17 is placed, hollowed out on its internal surface along its edge, with a peripheric groove 18 intended to give it flexibility in the radial direction. Laterally the sleeve 17 is restrained by pieces 19 fixed to the staves 16.

On the edge of the sleeve 17 there rests a lip 20 of a shaped expansible annulus 21 of rubber, provided with a bead 22 which is kept in position by components 23 fixed to components 19. Fixing the pieces 19 and 23 on staves 16 is done by means of a screw 24. The annulus 21 comprises a rib 25 which projects laterally and the function of which is very important for carrying out the process of the invention.

Since the lateral parts L are symmetrical with each other relatively to the medium plane of the drum, only the function of one of these lateral parts will be described.

Figure 6:
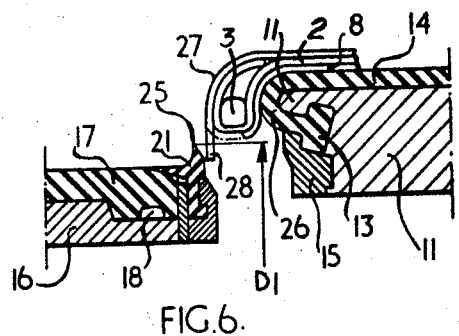

In order to carry out the process of the invention, the various stages of which are shown in FIGS. 6–11, the supports 11 of the drum are first of all separated and the diaphragm 14 is deflated in such a way as to present a cylindrical surface which extends beyond each side of the supports in a rounded part 26 (FIG. 6). On the diaphragm 14 are placed the internal layer of rubber 8, a carcass ply 2 turned up over the beads 3 which are situated beyond rounded parts 26 and a layer of rubber 27, the edge of which 28 (FIG. 6) extends radially inwardly of the corresponding bead.

The rib 25 of the annulus 21 makes it possible to turn up the edge 28 under the bead wire in a first stage. For this purpose the side of the rib 25 facing the drum is chamfered, as shown on the diagram. The lateral part of the drum is initially back beyond the edge 28 and it is expanded in such a way as to give the rib 25 a diameter $D_1$, such that when the said lateral part is brought nearer to the central component, the rib turns up and applies the edge 28 under the bead (FIG. 6).

Figure 7:
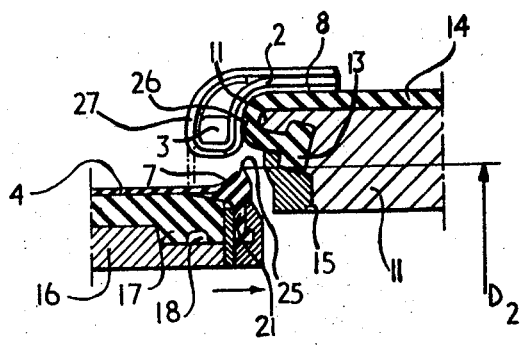

When this preliminary operation has been done, the lateral part is contracted to give the rib 25 a diameter $D_2$ which is less than $D_1$, as shown in FIG. 7.

The chafer strip 4 and sidewall rubber are positioned on the edge of the sleeve 17 and on the annulus 21, in such a way that the internal part 7 of the chafer strip comes to rest on the lip 20 and on the external side of the rib 25, then the position of the lateral part of the drum is adjusted so that the ridge of the rib 25 is situated opposite the annular groove between the rounded part 26 of the diaphragm 14 and the bead of the pneumatic tyre carcass.

Figure 8:
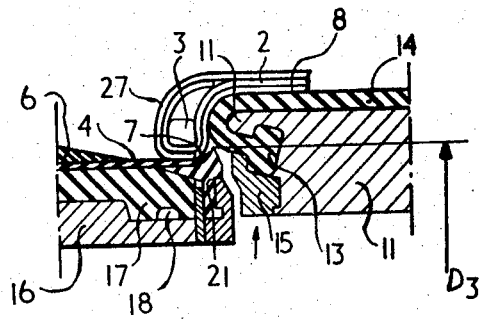

The lateral part of the drum is then expanded to give the rib 25 a diameter $D_3$ which is greater than $D_1$ and which is sufficient for the chafer strip 4 to be applied under the bead of the carcass. The profile of the annulus 21 is such that the chafer strip should be obliged to take the form of the bead and that in particular, the internal portion 7 of the said chafer strip which rests on the side of the rib 25 should be applied along the internal surface of the carcass, as shown in FIG. 8.

The peripheric groove 18 of the sleeve 17 gives a supplementary flexibility to the assembly of the sleeve edge and the annulus 21, which ensures excellent fitting for the chafer strip on the bead.

Following this operation the chafer strip 4 is seen to be adhered to the carcass bead by its portion in contact therewith.

Figure 9:
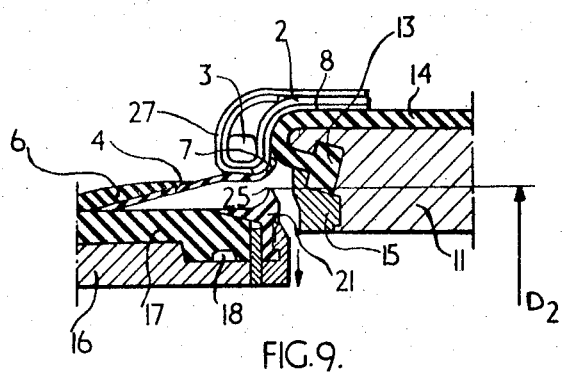

The lateral part of the drum is then contracted to return the rib 25 to diameter $D_2$ and to free the carcass bead from pressure as shown in FIG. 9.

The carcass is shaped by bringing the two supports 11 of the central part of the drum closer together and by inflating the diaphragm 14 as shown on FIG. 10, which makes the bead roll slightly on the rounded part 26 of the diaphragm in such a way that the edge of the portion 7 of the chafer strip 4 is wedged between the rounded part and the adjacent surface of the neighbouring bead.

The sleeve 17 is then expanded again, and the annulus 21, so that they keep the chafer strip in place under the bead in the way shown in FIG. 11. The rib 25 then has diameter $D_3$. Subsequently the lateral part 5 of the chafer strip and the side rubber 6, can be folded back on the carcass flank without difficulty.

FIGS. 12 and 13 show the mechanism which makes it possible to expand and contract the sleeve 17 and annulus 21, in such a way as to give the rib 25 the diameters $D_1$, $D_2$ and $D_3$ which have been referred to above.

The supports 11 of the central part of the drum and the lateral parts L thereof can be displaced along the shaft 10 and are constrained to turn with the shaft, by means of well known mechanisms which have not been shown.

Each lateral part L comprises a tubular framework 30 which surrounds the shaft 10 and which carries an annular support 31, fixed by means of a screw 32 and serving to keep an annular guide 33 in position, which is pierced by as many radial holes 34 as there are staves 16 in the lateral part. Each hole 34 contains a radial column 35 which is integral with one of the staves and terminated beyond the guide towards the framework 30 by means of a roller 36 the axis of which is perpendicular to the axis of the drum.

The columns 35 bear on a truncated cone-shaped ring 37 through their roller 36 and the ring slides on a cylindrical bearing surface 38 of the framework which is co-axial with the shaft 10 and situated between it and the guide 33. A joint 39 ensures fluid-tightness between the framework and the ring 37. Beyond the said ring, going away from the central part C, the framework 30 has a shoulder 40 which makes an annular chamber 41. Means, which are not shown, are provided to supply a fluid under pressure, for example compressed air, to the chamber 41. On the ring 37, there is fitted a casing 42 which slides on the shoulder part of the framework, and a joint 43 ensures fluid-tightness. Springs 44 are positioned between the guide 33 and the casing 42 in such a way as to bring back the assembly of this casing and the truncated cone-shaped ring 37 towards the shoulder 40 in the position shown in FIG. 12. In this position the chamber 41 has its minimum volume and the diameter of the rib 25 has its minimum value which is $D_2$.

If the fluid under pressure is introduced into chamber 41, the casing 42 and the ring 37 displace towards the central part C of the drum; the truncated cone-shaped portion of the ring moves the columns 35 radially outwardly and the staves 16 move away from the shaft 10 making the diameter of the rib 25 go first of all through the value $D_1$ which is shown by FIG. 13 then to the value $D_3$ (shown in dot-dash lines on FIG. 12). When the pressure in the space 41 is released, the springs 44 make the casing and the ring recoil in such a way as to reduce the diameter of the rib 25.

At its farthest extremity from the central part C, the framework 30 has a support 45 to which is articulated, round an axis 46 perpendicular to the drum axis, a lever 47, one arm of which extends along the casing 42 inwardly of a housing 48 which is fixed to the guide 33. The other arm of the lever 47 projects beyond the support 45 and is submitted to the action of a spring 49 which bears on a member 50 fixed on the support 45. A rocket member 52 is articulated at 51 on the member 50 and is terminated on one side by a pawl 53 which can come into engagement with the lever 47 to maintain this in an inoperative position substantially parallel to the shaft 10, counter to the spring 49. A spring 54 urges the pawl 53 towards the lever 47.

The shaft 10 carries an adjustable abutment 56 arranged in such a way that when the framework 30 is sufficiently removed from the central part C, the abutment presses against the side 55 of the rocker member 52 and the pawl 53 frees the lever 47 as has been shown in FIG. 13. Under the action of the recoil spring 49 the arm of the lever 47 situated inwardly of the housing 48 approaches the shaft 10.

In its surface facing the shaft, this arm of the lever has an opening 57 which is limited towards its pivot by a perpendicular edge 58 and towards the extremity of the lever by an inclined edge 59. The edge 58 of the opening is intended to co-operate with a stop 60 which is integral with the casing 42, to which it acts as an abutment when the lever 47 is unlocked, as shown in FIG. 13, in order to oppose the recoil of the said casing under the effect of the springs 44. The inclined edge 59 co-operates with the roller 61 mounted on the stop 60 to separate the lever 47 from the shaft 10 and to ensure re-bolting of this lever by the pawl 53 when the casing 42 is displaced sufficiently towards the central part of the drum under the action of compressed air in the space 41, and the lateral part is moved away from the abutment 56.

The function of the mechanism which has just been described is as follows:

When compressed air is introduced into the chamber 41, the casing 42 and the ring 37 advance towards the support 31, increasing the diameter of the sleeve 17 and that of the rib 25 of the lateral part of the drum up to the value $D_3$. The roller 61 which acts on the ramp 59 ensures bolting of the lever 47 in the position shown in FIG. 12.

When the chamber 41 is connected to the free atmosphere, the casing 42 and the ring 37 under the action of springs 44 recoil until they abut against a rear shoulder 62 of the framework 30 as shown in FIG. 12. The diameter of the rib 25 is then a minimum, namely $D_2$.

When the lateral part L is removed sufficiently from the central part C for the abutment 56 to ensure unlocking of the lever 47, the edge 58 of said lever comes into position in the path of the stop 60. If compressed air is then sent into the chamber 41 such that the stop 60 goes beyond the edge 58, but without the roller 61 causing unlocking of the lever 47, when the chamber 41 is connected to the free atmosphere the ring 37 and the casing 42 are arrested in their recoil movement under the effect of the springs 44, by abutment of the stop 60 on the edge 58, in the position shown on FIG. 13. The rib 25 then has the intermediate diameter $D_1$ which it must have for the folding-back operation illustrated in FIG. 6.

The invention can be applied to building pneumatic tyres of many different types and for many different purposes.

What is claimed is:

1. Apparatus for positioning a reinforcing strip under a pneumatic tire bead on a carcass which is positioned on a drum such that the bead is laterally adjacent of the drum, which apparatus includes means defining an annular expansible surface the profile of which is substantially complementary to that part of the bead which is to be nearest to the drum and drum axis, means for bringing the annular surface to the drum to a position opposite the bead, the diameter of the expansible surface being variable at least between a value less than the minimum bead diameter and a value at which the surface can apply a reinforcing strip positioned thereon to the bead, a plurality of movably mounted supporting members carrying said means defining an annular surface, said supporting members being arranged coaxially relative to said drum, means for moving said supporting members radially to expand said annular surface, and a plurality of radially disposed columns, in which the supporting members are carried on said radially disposed columns, and said means for moving the supporting members comprises means for radially shifting said columns.

2. Apparatus according to claim 1 further comprising an axially movable truncated conical member for supporting the radially inward ends of said columns, and wherein the columns are movable radially outwardly in response to movement of said truncated conical member.

3. Apparatus according to claim 2 further comprising an annular slide disposed coaxially with the drum and supporting said truncated conical member, and a tubular frame having said annular slide mounted thereon and forming, together with the slide, a chamber of variable volume into which fluid under pressure can be supplied to move said slide.

4. Apparatus according to claim 3 further comprising a spring coupled to said slide, wherein the fluid pressure moves the annular slide against the force of said spring.

5. Apparatus according to claim 3 in which means are provided for maintaining the annular slide in a position corresponding to a selected expansion of the annular surface.

6. Apparatus according to claim 5 in which the means for maintaining the annular slide in said position comprises a stop member on the frame and an arresting lever adapted to engage said stop member to arrest the return of the slide under the influence of the spring at a selected point.

7. Apparatus according to claim 6 further comprising a pawl for locking the lever in an inoperative position and for releasing the lever in response to axial movement of the frame laterally away from the drum to a predetermined distance, and means for automatically re-locking the lever in said inoperative position upon application of fluid pressure to move the annular slide against the force of the spring when the frame has been axially moved towards the drum.

References Cited
UNITED STATES PATENTS

| | | | |
|---|---|---|---|
| 2,455,038 | 11/1948 | Breth | 156—403 |
| 2,951,526 | 9/1960 | Haase | 156—401 |
| 3,281,305 | 10/1966 | Nadler et al. | 156—401 |
| 2,409,974 | 10/1946 | Breth et al. | 156—132 |
| 2,605,198 | 7/1952 | Haase | 156—132 |
| 3,127,294 | 3/1964 | Porter | 156—398 X |
| 3,188,260 | 6/1965 | Nebout | 156—401 X |
| 3,265,549 | 8/1966 | Woodhall et al. | 156—401 X |
| 3,374,138 | 3/1968 | Porter et al. | 156—403 X |
| 3,396,066 | 8/1968 | Nadler | 156—403 X |
| 3,409,490 | 11/1968 | Pacciarini et al. | 156—133 X |

ALFRED L. LEAVITT, Primary Examiner

C. B. COSBY, Assistant Examiner

U.S. Cl. X.R.

156—132, 135